UNITED STATES PATENT OFFICE.

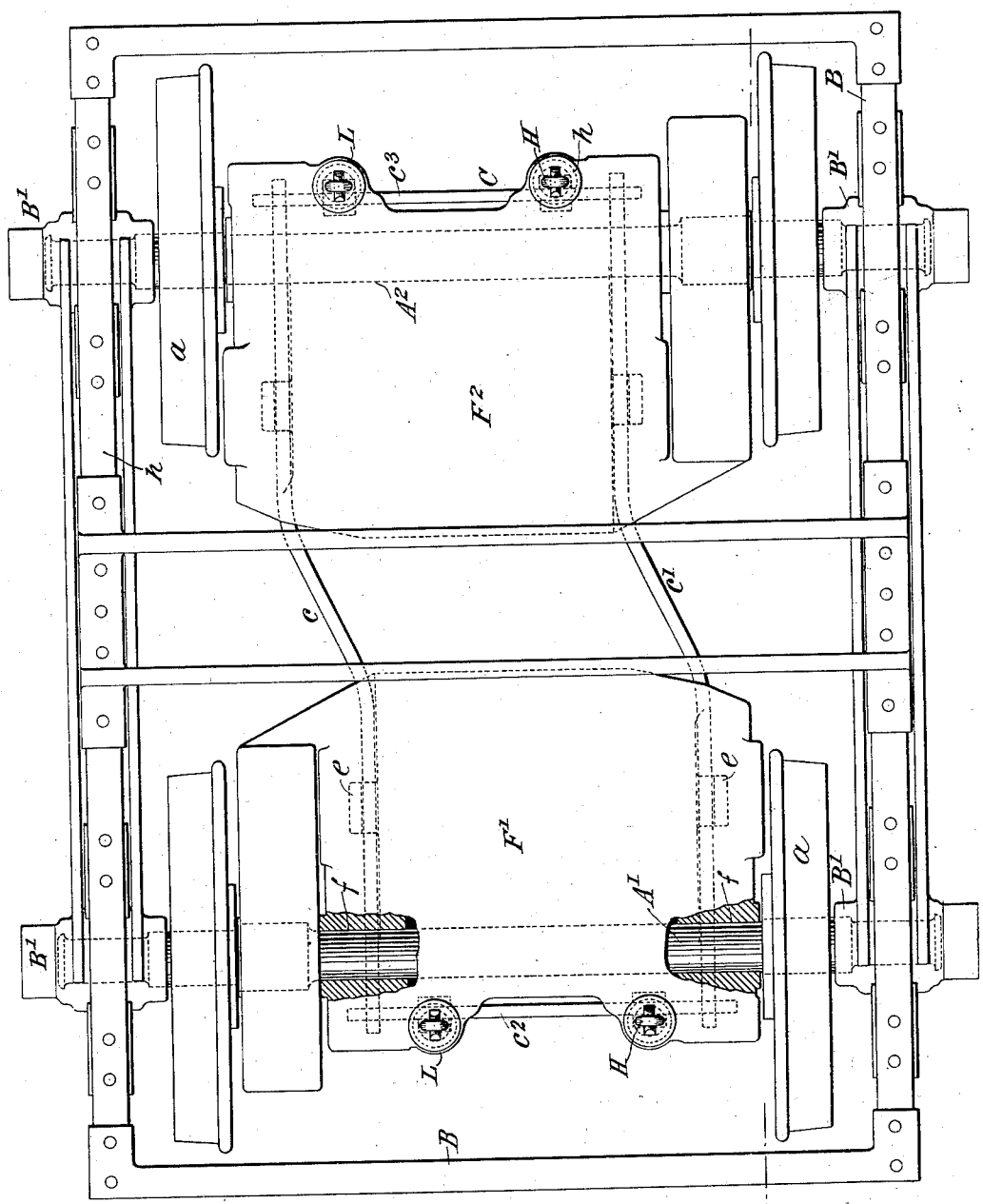

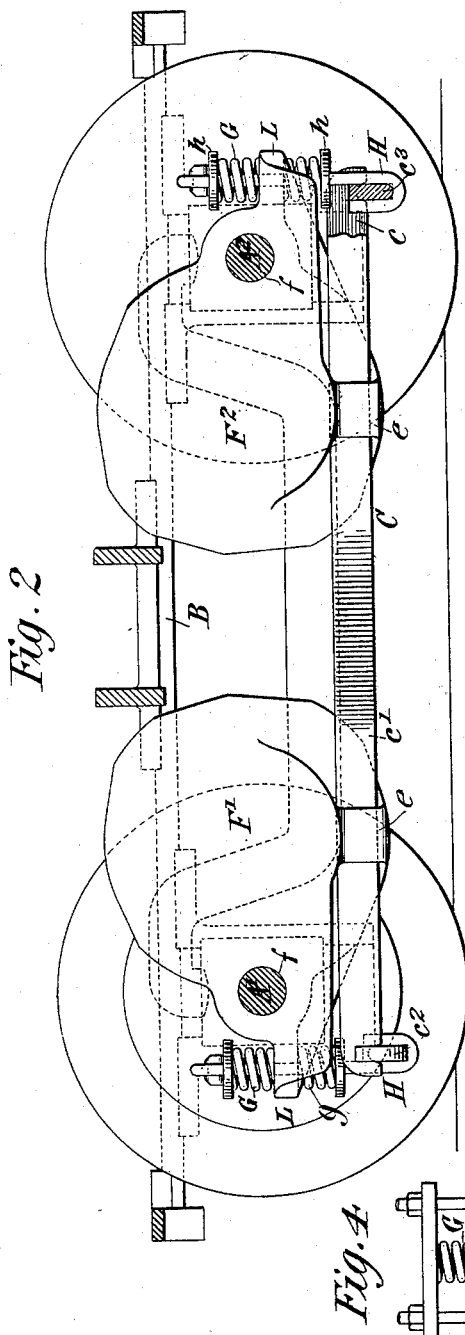
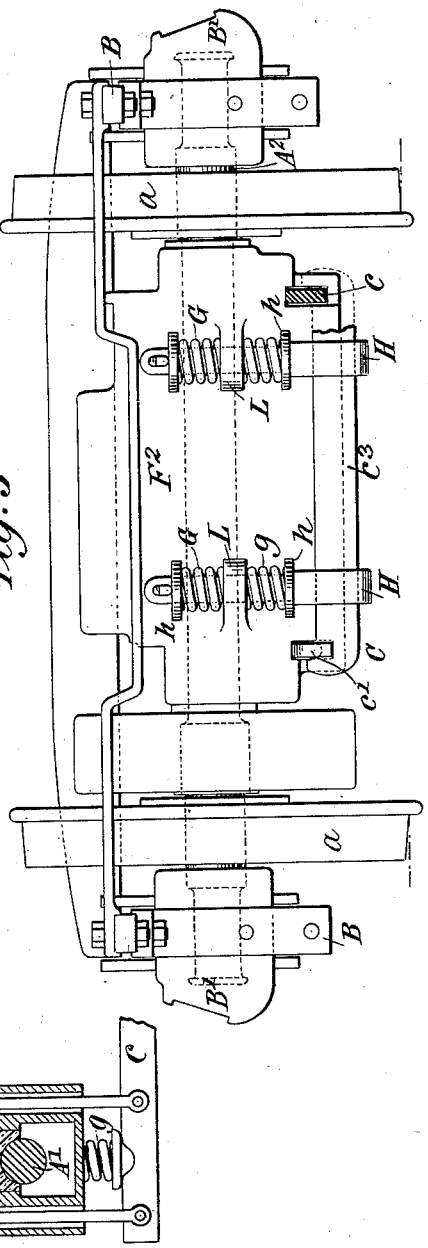

GEORGE GIBBS, OF PHILADELPHIA, PENNSYLVANIA.

ELECTRIC-MOTOR SUSPENSION.

SPECIFICATION forming part of Letters Patent No. 656,635, dated August 28, 1900.

Application filed February 28, 1898. Serial No. 672,011. (No model.)

*To all whom it may concern:*

Be it known that I, GEORGE GIBBS, a citizen of the United States of America, and a resident of Philadelphia, in the county of Philadelphia and State of Pennsylvania, have invented certain new and useful Improvements in Electric-Motor Suspension, of which the following is a specification.

My invention relates to the suspension of electric motors employed for propelling vehicles.

The object of the invention is to provide a convenient and economical form of suspension which is independent of the framework of the truck, does not interfere with the action of the springs supporting the body of the vehicle, relieves the truck from undue strain, and generally so supports the motors that their power is applied to the operation of the vehicle with the least disturbance to the easy-riding qualities thereof and at the same time relieves the track and motors from undue pounding.

In the accompanying drawings, Figure 1 is a plan of a car-truck equipped with motors suspended in a manner illustrating the invention. Fig. 2 is a side view thereof. Fig. 3 is an end view of the truck and motor suspension. Fig. 4 illustrates a modification.

Referring to the drawings, $A'$ and $A^2$ represent the two axles of a truck, and B represents the truck-frame. These may be of any usual construction. The car-wheels are represented at $a$. The truck-frame is supported upon the car-axles through boxes $B'$ in the usual manner. A frame or cradle C is provided for the motors. This frame comprises two side bars $c$ and $c'$, which at their respective ends rest upon or are attached to cross-bars $c^2$ and $c^3$, and these cross-bars are here shown as being respectively supported by means of hangers H, carried by springs G, resting upon lugs or extensions L of the motors. They may be supported directly upon the inner axle-bearings. The motors are represented at $F'$ and $F^2$, and they may be of any well-known construction, sleeved at $ff$ upon the respective axles $A'$ $A^2$. I have represented them as being provided with gear-wheels at their corresponding ends, so that when placed in position upon the car-truck they are not exactly in line, the gears upon one being adjacent to the right-hand car-wheel of its axle and the gears of the other adjacent to the left-hand car-wheel of its supporting-axle. For this reason the side bars $c$ and $c'$ are bent, as shown in the drawings. If all the gear-wheels were placed on the same side of the car, then the bars might be straight. The side bars are shown as passing through lugs or sleeves $e$, formed in the field-magnet shells or casings of the motors. These lugs prevent the motors either rising or falling any material distance without occasioning a corresponding movement on the part of the side bars. The side bars may be pinned or otherwise fastened to the motors instead of passing through sleeves. The field-magnets of the motors rest upon the side bars; but when the car is propelled in one direction there is an increased tendency for the field-magnet of one of the motors to press downward, while there is a corresponding tendency on the part of the other motor to be raised, and this condition is reversed when the direction of armature rotation is reversed. As the motors are centered upon their respective car-axles, they may turn slightly about them; but such motion is opposed by the springs G and springs $g$, placed between the lugs L and collars $h$ upon the hangers H. It will be further observed that each motor receives a flexible support not only from the springs adjacent to its own axle, but also through those springs which are adjacent to the axle of the other motor, the whole supporting-frame of the motors being a form of cradle which itself is supported flexibly at its respective ends. In this manner the greater portion of the weight of the motor is supported indirectly upon the car-axles, and the entire weight is independent of the main truck-frame. The cradle may be used for only one motor, if desired, the end of the cradle farthest from the motor being carried on one or more inside boxes $B^2$, supported on the axle, as shown at K in Fig. 4.

I claim as my invention—

1. The combination with a car-truck, of a motor for propelling the same journaled upon the axle and geared thereto and having its field-magnet upon one side thereof, an extension from said motor, or its casing, upon the other side of said axle, a cradle for the motor, and a spring suspension for supporting the other end of said cradle from said extension.

2. The combination of an electric-car truck, two motors having their field-magnets between the axles of the truck and respectively sleeved upon said axles, and a cradle for said motors flexibly supported at its respective ends from extensions of said motors outside the axles.

3. The combination of an electric motor, a car-axle upon which the same is journaled, a supporting frame or cradle therefor, one or more extensions of said motor or its frame, outside the axles, hangers for supporting one end of the frame or cradle carried by said extension or extensions, and springs supporting said hangers from said extension substantially as described.

4. The combination of an electric motor, a car-truck upon one of the axles of which the motor is sleeved, one or more supporting-bars connected to said motor, spring suspensions for the bars from the axle to which the motor is sleeved through an extension of the motor on the side opposite the field-magnet of the motor and supports for the other ends of said bars from the other axle.

5. The combination of a pair of axles, motors journaled therein, and a skewed frame supported by the motors at each side of each end, the corresponding sides of the opposite ends of the frame being supported in different longitudinal planes, and the point on each motor from which the frame is supported having smaller vertical motion than the side thereof which is supported by the frame, substantially as described.

6. The combination of a pair of axles, a motor journaled on one of the axles, and a frame which supports the armature end of the motor, and is supported at one end by the motor at one side of the pivotal point of the latter and at the opposite end from the other axle, substantially as described.

7. The combination of a pair of axles, motors journaled thereon, and a frame supporting the armature end of the motors and supported by the motors to one side of the pivotal points thereof, the point on each motor from which the frame is supported having smaller vertical motion than the point at which the motor is supported by the frame, substantially as described.

Signed by me this 25th day of February, 1898.

GEORGE GIBBS.

Witnesses:
CHARLES W. TERRY,
J. H. JONES.